(12) United States Patent
Abir

(10) Patent No.: US 6,738,827 B1
(45) Date of Patent: May 18, 2004

(54) METHOD AND SYSTEM FOR ALTERNATE INTERNET RESOURCE IDENTIFIERS AND ADDRESSES

(76) Inventor: Eli Abir, P.O. Box 684 910 Rte. 35, Cross River, NY (US) 10518

( * ) Notice: Subject to any disclaimer, the term of this patent is extended or adjusted under 35 U.S.C. 154(b) by 0 days.

(21) Appl. No.: 09/303,204

(22) Filed: Apr. 30, 1999

Related U.S. Application Data

(60) Provisional application No. 60/102,333, filed on Sep. 29, 1998.

(51) Int. Cl.$^7$ .............................................. G06F 15/16
(52) U.S. Cl. ............................ 709/245; 709/218; 704/8
(58) Field of Search ................................. 709/202, 218, 709/225, 239, 245; 704/2, 4, 8

(56) References Cited

U.S. PATENT DOCUMENTS

| | | | |
|---|---|---|---|
| 5,774,660 A | * 6/1998 | Brendel et al. | |
| 5,778,231 A | 7/1998 | van Hoff et al. | |
| 5,884,246 A | * 3/1999 | Boucher et al. | 704/2 |
| 5,911,776 A | 6/1999 | Guck | |
| 5,961,593 A | * 10/1999 | Gabber et al. | 709/225 |
| 5,966,719 A | * 10/1999 | Okumura | |
| 5,974,371 A | * 10/1999 | Hirai et al. | 704/2 |
| 5,994,790 A | 11/1999 | Nagashima et al. | |
| 6,003,049 A | * 12/1999 | Chiang | |
| 6,044,382 A | * 3/2000 | Martino | |
| 6,061,735 A | 5/2000 | Rogers | |
| 6,061,738 A | * 5/2000 | Osaku et al. | 709/245 |
| 6,101,537 A | * 8/2000 | Edelstein et al. | |
| 6,119,078 A | 9/2000 | Kobayakawa et al. | |
| 6,130,892 A | * 10/2000 | Short et al. | |
| 6,138,159 A | * 10/2000 | Phaal | |
| 6,182,148 B1 | 1/2001 | Tout | |
| 6,192,415 B1 | * 2/2001 | Haverstock et al. | 709/245 |
| 6,195,707 B1 | * 2/2001 | Minh | 709/245 |
| 6,205,418 B1 | * 3/2001 | Li et al. | 704/8 |
| 6,314,469 B1 | * 11/2001 | Tan et al. | 709/245 |
| 6,321,372 B1 | * 11/2001 | Poirier et al. | |
| 6,324,500 B1 | * 11/2001 | Amro et al. | 708/8 |
| 6,347,316 B1 | * 2/2002 | Redpath | |
| 6,381,567 B1 | * 4/2002 | Christensen et al. | 704/8 |
| 6,418,402 B1 | * 7/2002 | King et al. | 704/8 |
| 6,446,133 B1 | * 9/2002 | Tan et al. | 709/245 |
| 6,480,867 B1 | * 11/2002 | Kwan | 709/245 |
| 6,522,330 B2 | * 2/2003 | Kobayashi | |
| 2001/0039615 A1 | * 11/2001 | Bowker et al. | |
| 2002/0013810 A1 | * 1/2002 | Hwa | |
| 2002/0093683 A1 | * 7/2002 | Focazio et al. | |
| 2002/0107684 A1 | * 8/2002 | Gao | 704/4 |
| 2002/0111788 A1 | * 8/2002 | Kimpara | 704/2 |

OTHER PUBLICATIONS

Mockapetris, Nov. 1997, RFC 1035, pp. 1–2.*
Goldsmith, Jul. 1994, RFC 1641, pp. 1–6.*
Berners–Lee, Dec. 1994, RFC 1738, pp. 1–25.*
Ohta, Jul. 1995, RFC 1815, pp. 1–6.*
Whistler, Jan. 1999, RFC 2482, pp. 1–14.*
Graham, Unicode: A Primer, 2000, M&T Books, p. 1.*
Maeda, Akira et al. "Viewing Multilingual Documents on Your Local Web Browser". Communications of the ACM, vol. 41, No. 4, Apr. 1998. See p. 65, $2^{nd}$ and $3^{rd}$ paragraph.
Sakaguchi, Tetsuo et al. "A Browsing Tool for Multilingual Documents for Users without Multi–lingual Fonts" Apr. 1996 See p. 64–65.
JP 409311749 A (SAITO) Dec. 2, 1997.
M. Duerst, Internationalization of Domain Names, www.ap-ng.org/multilingual/internet–draft–duerst–dns–il8n–01.txt, Jul. 1997.

* cited by examiner

Primary Examiner—Le Hien Luu
Assistant Examiner—Stephan Willett
(74) Attorney, Agent, or Firm—Arnold & Porter LLP

(57) ABSTRACT

A method and system for using alternative resource identifiers in the place of the conventional resource identifiers. The invention transforms the alternative resource identifier to a conventional resource identifier using software on-the-fly. The resources on the Internet are then accessed using the conventional resource identifiers in the conventional manner and are displayed to the user.

39 Claims, 17 Drawing Sheets

METHOD AND SYSTEM FOR ALTERNATE INTERNET RESOURCE IDENTIFIERS AND ADDRESSES

CROSS-REFERENCE TO PROVISIONAL APPLICATION

This application claims the benefit of a provisional application filed on Sept. 29, 1998 under the title "Internet Browser with URL Conversion System" and assigned Serial No. 60/102,333.

FIELD OF THE INVENTION

The present invention relates generally to the field of information transfer over the Internet and the various protocols associated with such information transfer.

BACKGROUND OF THE INVENTION

The Internet presents significant challenges and opportunities to providers of traditional network services. The number of Internet users is growing exponentially, stimulating network service providers to create new services to capture this new market.

One successful and widely publicized portion of the Internet is the World Wide Web. The World Wide Web is the total set of interlinked hypertext documents residing on HTTP (Hypertext Transfer Protocol) servers all around the world. Documents on the World Wide Web, called pages or Web pages, are written in HTML (Hypertext Markup Language), identified by URLs (Uniform Resource Locators) that specify the particular machine and pathname by which a file can be accessed, and transmitted from node to node to the end user under Hypertext Transfer Protocol. Codes, called tags, embedded in an HTML document associate particular words and images in the document with URLs so that a user can access another file, which may be halfway around the world, at the press of a key or the click of a mouse. These files may contain text (in a variety of fonts and styles), graphics images, movie files, and sounds as well as Java applets, ActiveX controls, or other small embedded software programs that execute when the user activates them by clicking on a link. A user visiting a Web page also may be able to download files from an FTP site and send messages to other users via e-mail by using links on the Web page. FIG. 11 is a screen shot of a conventional Web browser.

At a conceptual level, the World Wide Web can be thought of as a vast, hyperlinked bank of data. To gain access to the World Wide Web, a user must install on his or her computer the appropriate software and obtain a network connection from an Internet access provider.

The URL identifier for a resource specifies the protocol to be used in accessing the resource (such as "http:" for a World Wide Web page or "ftp:" for an FTP site), the name of the server on which the resource resides and optionally the path to a resource (such as an HTML document or a file on that server.) For example, in the URL http://www.israeliinternet.com/thissubsite/sitecontents.html, "http://" identifies the Hyper Text Transfer Protocol; www.israeliinternet.com is the name of the relevant Web server; "/thissubsite/" identifies the directory of the desired document; and "sitecontents.html" designates the document to view.

The name of the computer server that constitute part of a resource's URL is not simply selected by the operator of the server but must be registered with the appropriate authorities. Otherwise, chaos would result if multiple servers had the same name. (This chaos is similar to the problem if several different radio stations all broadcast simultaneously on the same frequency.)

Each server name is associated with the 32 bit IP address that identifies a host machine on the Internet. The association is accomplished through the use of other computers known as Domain Name Servers. See Siyan, Karanjit, *Inside TCP/IP*, $3^{rd}$ ed., New Riders Publishing, 1997.

For purposes of this patent application, the URL that is recognized on the Internet is referred as the "conventional URL" and the server name that is recognized on the Internet is referred to as the "conventional server name." For purposes of this patent application, reference to languages, alphabets characters and glyphs are based on the terminology used in the specification for the Unicode standard. See *The Unicode Standard Version* 2.0, Addison-Wesley, 1998. For purposes of this patent application a character is defined as smallest component of written language that has semantic value; a glyph, on the other hand, represents the shape that the character can have when it is rendered or displayed.

Currently, all conventional URLs use Latin characters even if the URL is used in a written language that does not use Latin characters. FIG. 12 is a screen shot of a Hebrew language browser. Unfortunately, it can be difficult for users whose native written language does not use Latin characters to directly access Internet resources with conventional URLs because the user must remember complex and unfamiliar words or characters. In addition, a conventional URL must be provided in a specific syntax, which is difficult for many users to understand, and even the minor errors, such as confusing "." with"," would result in the user failing to access the desired resource.

When a person looks to go to somewhere in the World Wide Web, the URL address of which he or she does not know, one has to use a search engine. Most people, however, refrain from going online for two reasons. First, they have overwhelming number of options at every turn. Second, they are encountered with too many irrelevant sites, when using a search engine.

In addition to this, many Internet users will insert the generic URL address relating to the product they are looking for. For example, a person who is looking for car insurance will input the address "car insurance" in his browser. Consequently, the owner of the Internet address "car insurance", will inevitably have continual stream of consumers who are looking for car insurance. In short, generic URL addresses are valuable because they are easy to remember.

SUMMARY OF THE INVENTION

It is an object of the invention to provide a system and method for a user of an apparatus whose written language is not based on a Latin characters to access a HTML page by inputting to the apparatus resource identifier that does not contain Latin characters.

It is an object of the invention to provide a system and method for a user of an apparatus to access a HTML page by inputting to the apparatus a resource identifier that is simpler or otherwise more desirable than the conventional URL.

The invention contemplates the transformation of a conventional URL to an identifier that is familiar to the user. (This familiar identifier will be referred to as a "friendly" identifier.) This transformed identifier would be displayed to the user. Internally, the apparatus would continue to use the conventional URL and would use this URL in accessing resources on the Internet. Similarly, all resource identifiers that are returned to the apparatus as a result of its operations would be transformed into identifier that are familiar to the user.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF PREFERRED EMBODIMENTS

Introduction

The overall objective of the invention is to make using the World Wide Web and e-mail a more natural experience for the majority of the world's population who do not use Latin characters in their written language.

Specifically, the invention permits transformation of a conventional URL to any native language that a Web surfer may use. Users of a preferred embodiment of the invention will be able to view Web site addresses in the user's own written language and use e-mail addresses in their own written language.

The invention takes several different embodiments each geared to a specific situation. Each embodiment, however, relies on transforming an alternative resource identifier into a conventional resource identifier. The hidden conventional resource identifier is then used to access resources on the Internet in a conventional manner. The conventional resource identifier may be hidden for cosmetic reasons from the user or would be available if the user so desired.

This strategy is a common approach in software engineering. For example, storage devices such as magnetic disk drives can be made to appear to the user to be much larger in capacity than they actually are by compressing the data stored on the disk drive in a lossless manner. When a user actually accesses data, the data is uncompressed on-the-fly in a manner that is concealed for cosmetic reasons from the user. Although the additional steps result in delay, it is well-known in the art how to reduce the delay to an imperceptible interval of time.

The present invention contemplates displaying a easily comprehensible resource identifier (that is, a friendly identifier) to the user, while the apparatus uses a conventional resource identifier in accessing resources on the Internet. The apparatus achieves this functionality by transforming, on-the-fly, the friendly resource identifier to a conventional resource identifier. This transformation process is referred to in this patent application as a transformation algorithm.

In this detailed description, two preferred embodiments of the transformation algorithm are disclosed. However, those individuals of ordinary skill in the art could develop other transformation algorithms; the disclosure of the two algorithms is not meant to limit the invention to only the disclosed algorithms.

Transformation Algorithms

Figure 1:
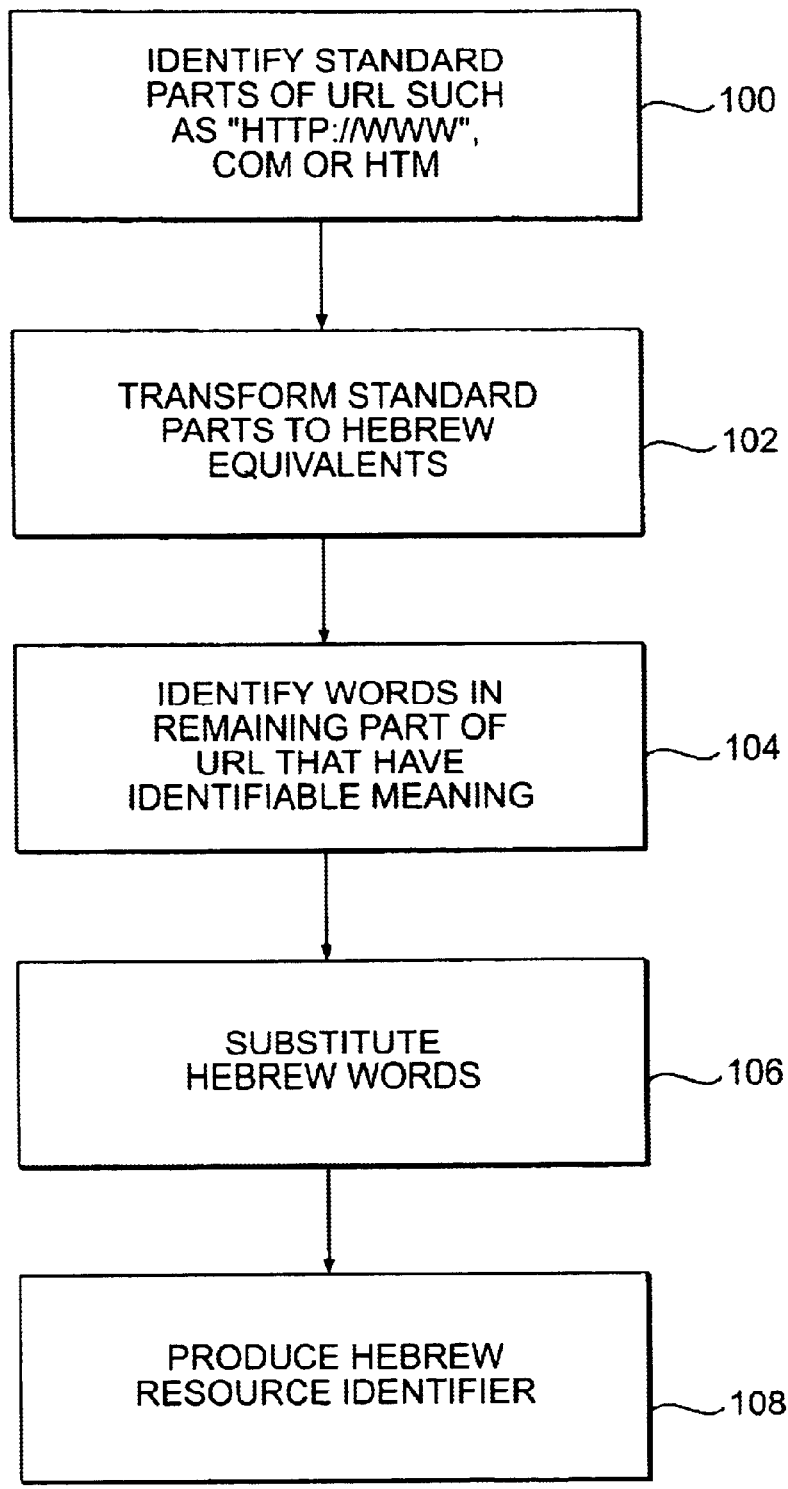
FIG. 1 is a flowchart illustrating the conversion algorithm.
Figure 2:
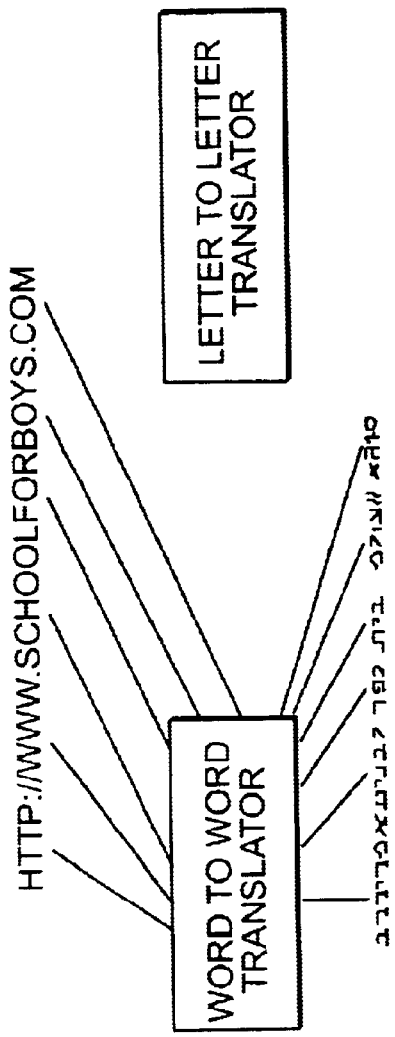
FIGS. 2–5 are diagrams illustrating the conversion algorithm.
Figure 3:
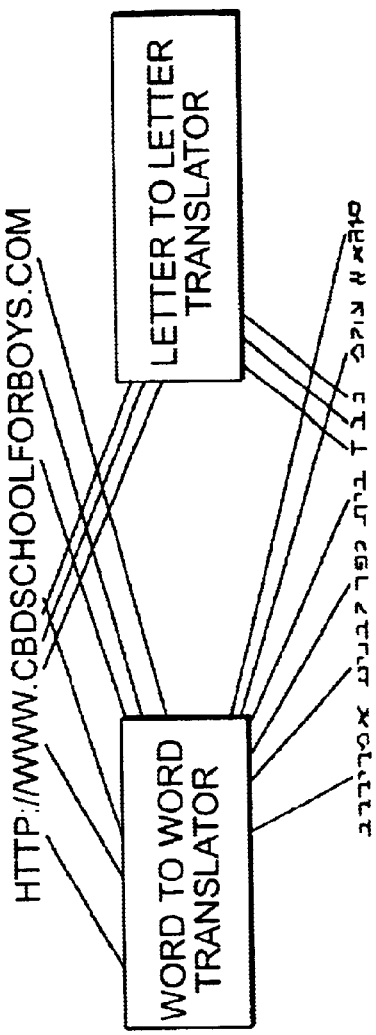
Figure 4:
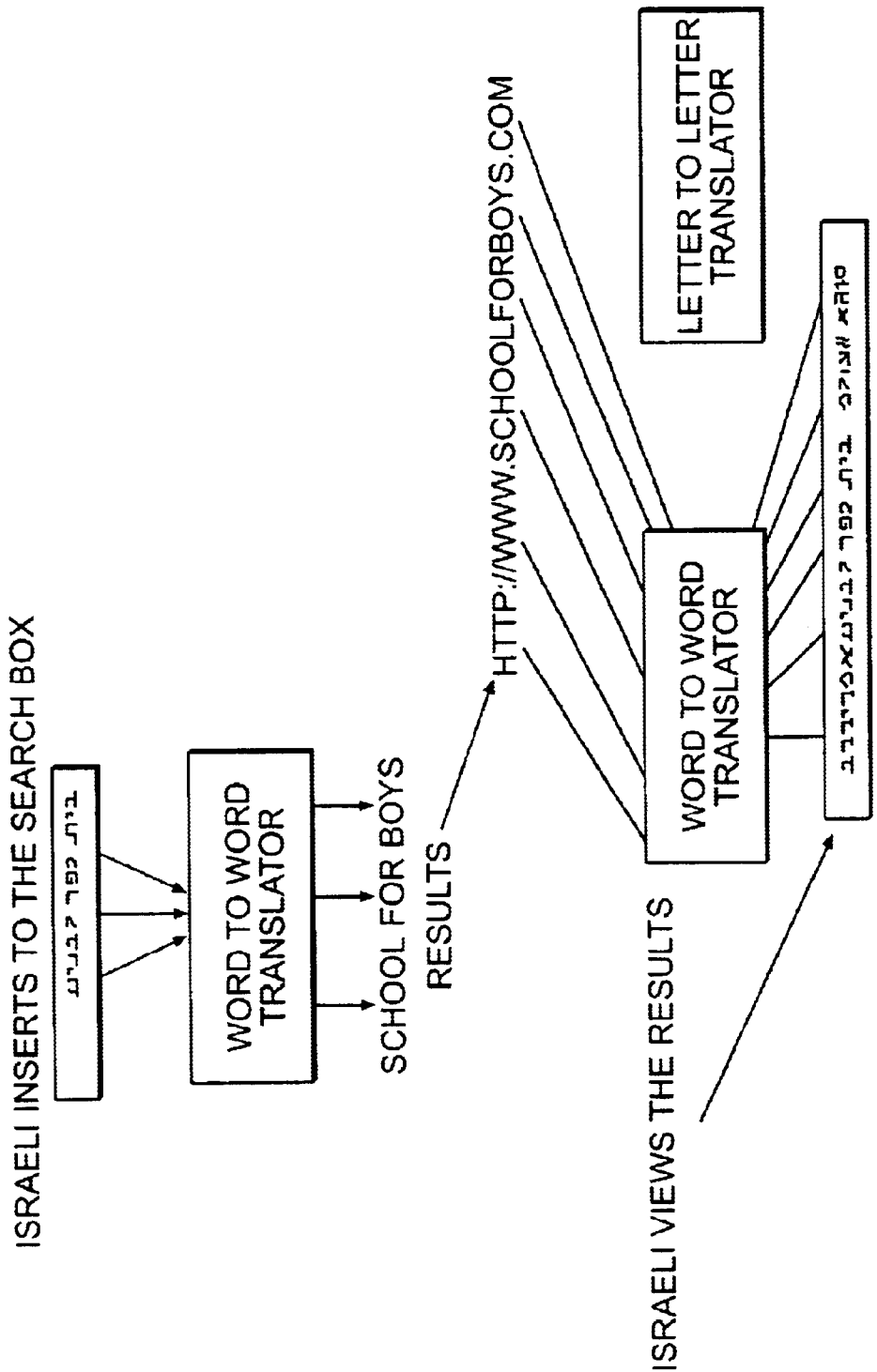

1. Conversion Algorithm. Referring now to FIG. 1, there is illustrated the "conversion" algorithm for transforming a conventional resource identifier into a friendly resource identifier. (For purposes of this disclosure of this preferred embodiment of the transformation algorithm, the set of characters of the non-Latin written language used are the Hebrew characters.) In step 100, standard parts of conventional resource identifiers such as "http://www" "com" and "htm" are identified. In step 102, the standard parts are converted to well-known Hebrew equivalents such as ווו//:דדח for "http://www" and בֿגוע for "com". In step 104, the remaining parts of the conventional resource identifier is analyzed for words that have identifiable meanings. For example, the words "health" and "insurance" would be recognized in the word "healthinsurance". In step 106, the Hebrew word בריאות would be substituted for "health" and the Hebrew word ביטוח would be substituted for insurance. In step 108, the complete Hebrew resource identifier would be produced.

It is likely that the algorithm could not proceed to completion as detailed above because certain letters would belong to words that are not recognized or the resource locator does not contain any recognizable words. For example, the part of a conventional resource identifier "insurancebz" would be sorted into the two components "insurance" and "bz". The component "insurance" would be transformed into the Hebrew word for insurance the letter "b" would be transformed into ב and the letter z would be transformed into ת. In such case each Latin letter would be translated into a predetermined Hebrew letter. The details of implementing this algorithm is well-known in the art and are illustrated in FIGS. 2–5.

It is also well-known that an algorithm could be constructed that would produce from every conventional resource identifier (which is composed of Latin characters) a single resource identifier, and if the algorithm was applied to the resource identifier composed of Hebrew characters, then the original conventional resource identifier composed of Latin characters would be recovered.

Figure 5:
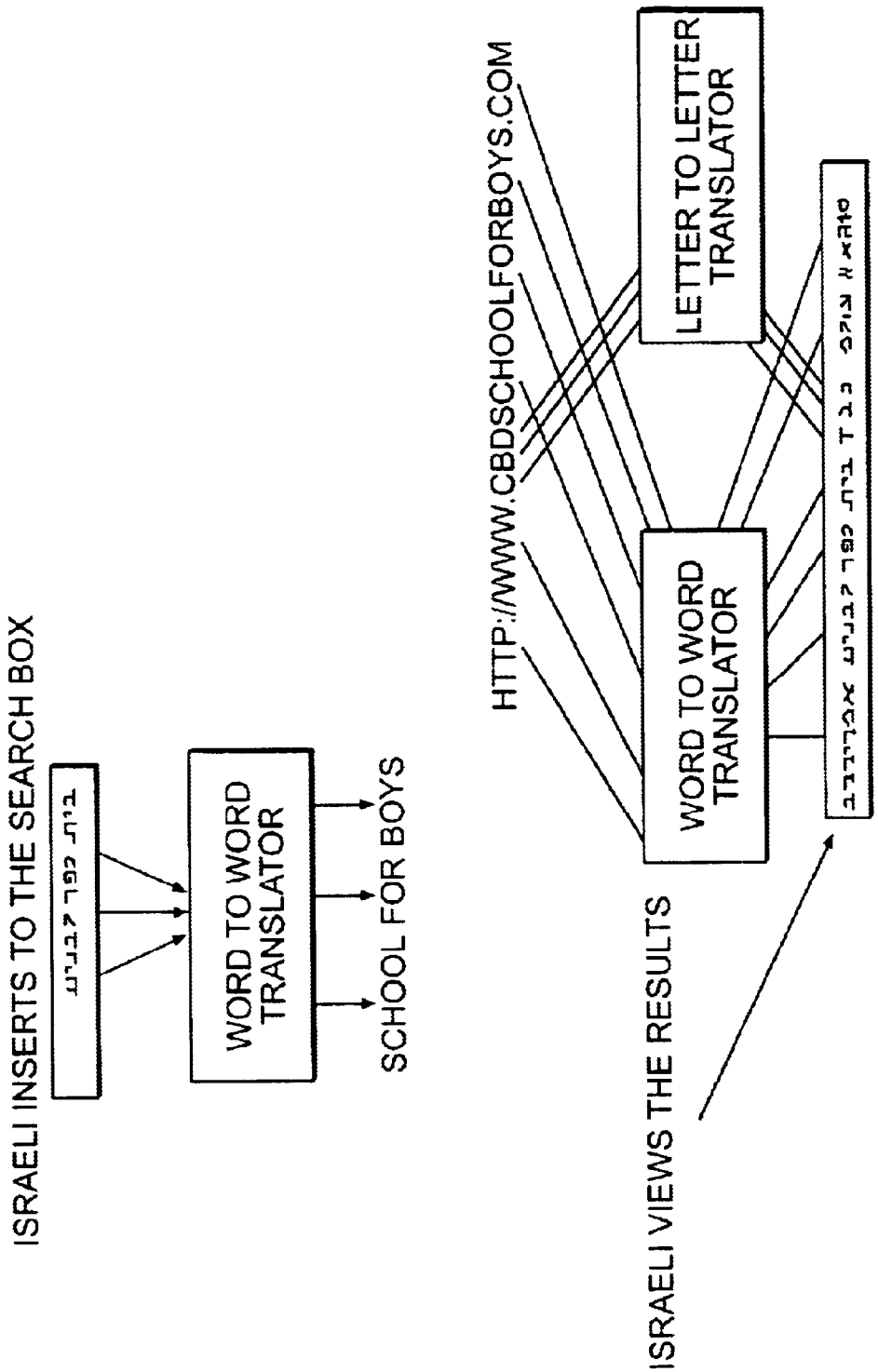
Figure 6:
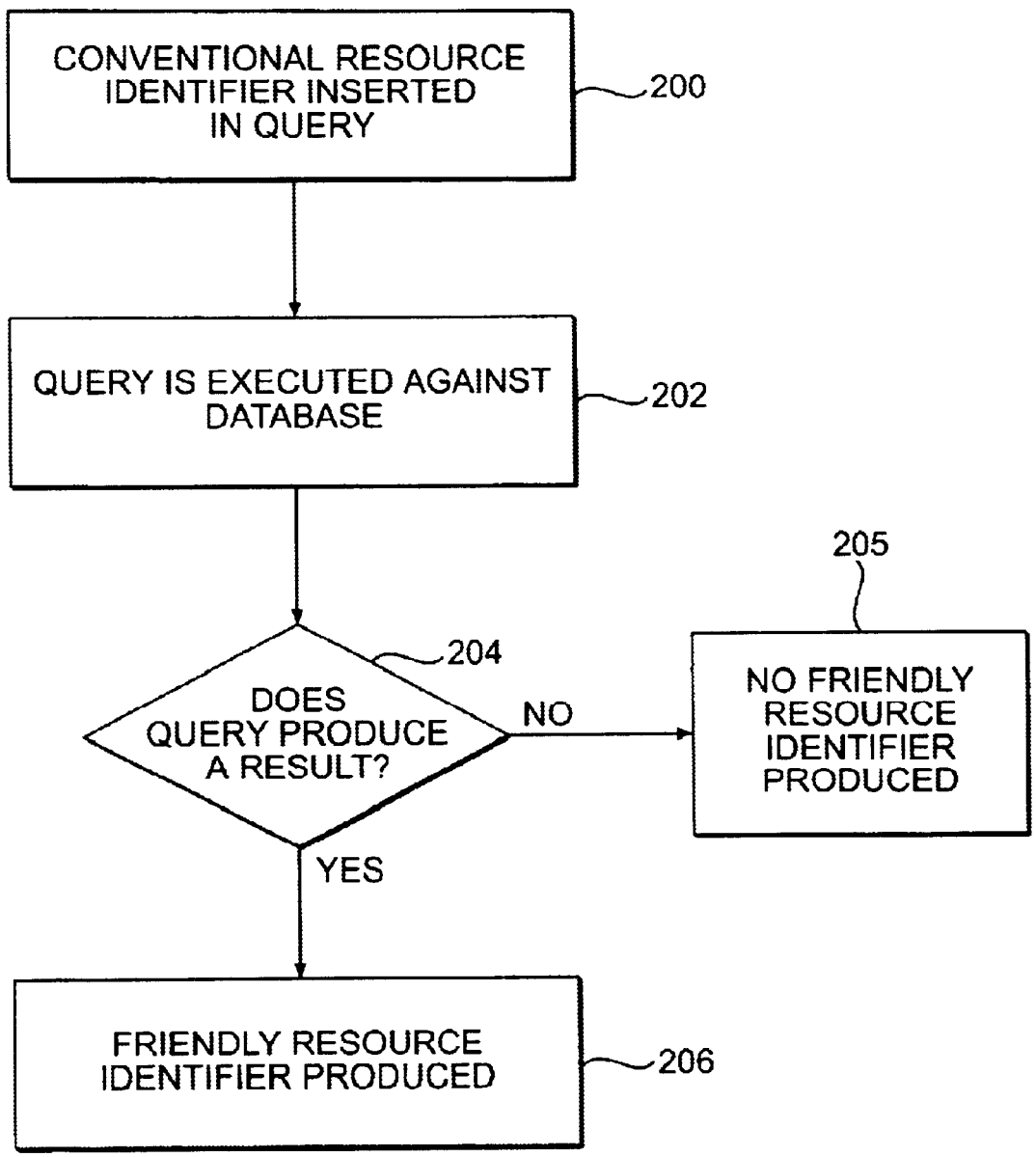
FIG. 6 is a flowchart illustrating the mapping algorithm.

2. Mapping Algorithm. Referring now to FIG. 5, there is illustrated the "mapping" algorithm for transforming a conventional resource identifier into a friendly resource identifier. (Again for purposes of this disclosure of this preferred embodiment of the transformation algorithm, the set of non-Latin characters used are Hebrew characters.) In step 500, the conventional resource identifier is inserted into a database query. In step 502, the database query is executed against a database of friendly resource identifiers. Each friendly identifier record in this database would have a field indicating the conventional resource identifier to which the friendly resource identifier is mapped. In step 504, the success of the query is evaluated. If the query produced a result then that result in step 506 would be the friendly resource identifier. If the query did not produce a result, then failure to obtain a friendly resource identifier would be indicted.

As an example of this algorithm, the conventional resource identifier http://www.healthinsurance.com would be mapped to the Hebrew characters.

An important useful feature of the mapping algorithm is that any conventional resource identifier could be mapped to any friendly resource identifier. Accordingly, a resource that is merely one of many web pages on a server could be made to appear from its friendly resource identifier to be the default page (that is, the top page) of the Web server.

Overview of Preferred Embodiments of Invention

Conceptually, it is a two-way conversion of URLs to and from any native language an Internet surfer may use. Users of the system, will be able to view Web site addresses, email addresses, and every other URL, in every web site they arrive at, in his/her own language as soon as they arrive at the location, or as soon as the resource identifier appears in their e-mail box or other software. The system will also distinguish between addresses that are from the World Wide Web, or whether they are native language web site owners. Both native address systems will be enabled simultaneously. Thus to the surfer, the only distinction will be the fact that portal system address users may not have the .com,.net, .co.il, or similar items follow their address.

Using the invention, non-English speaking Internet users will not even have to have English characters on their keyboard. They will be able to dial any location on the World Wide Web including e-mail using their own native language keyboard. The invention will allow for every Internet user world wide, to use their regular mailing address, in their native language, as their e-mail address. The disclosed system will receive and deliver email from that address to any location on the Web. In a portal based system, there will be an option for on screen keyboard in every language. Thus, a user will be able to use his mouse to click native language addresses, email, search engine, and similar items even if the user is in a location where the user has no access to a native language keyboard.

The system, in each language, will be locked into a site. That site will be a specific home page in that language. Every Internet address in that language will be directed into a sub site. To the users, both Web site owners, as well as surfers, the sub site will appear and function as a home page. For example, when an Israeli individual obtains the Hebrew address, the system will convert that Israeli address into an URL that will appear after the regular address. In this case, surfers who do not use the conversion system will see, and may key in, by using the Internet address: http://www.worldurls.com/healthinsurance. An Israeli individual who uses the Hebrew conversion system will view and dial the address in Hebrew. E-mail in this example may go through healthinsurance@worldurls.com. Obviously, conversion system users will key in and view the e-mail with a Hebrew address. The server part of the system will accept free Web sites and e-mail applications. A person may insert an existing URL if the person only wants the address to link to their existing Web site.

In addition, a users may choose a native language Internet address or e-mail account name. If the Internet address or e-mail user name is taken, the user may enter a different choice. At the end of the registration process, the system may will generate a Web page or e-mail account. At the sub-site level, the internal name assignment system will work in a similar fashion to the way the system works in the direct translation portion of the system. Thus, using the two tier transformation system, i.e., the combination of the words and letter every web site owner will have their sub sites translated automatically as well.

1. On the fly strictly URL translation from Latin to native language address system. Surfers that arrive at locations that are not a part of the portal address assignment system (that is, any Web site located on the World Wide Web) will also see in the URL box their own native language rather then Internet protocol. When the surfer, whether through a portal or through the use of the desk top based option, arrives at non-system users Web site, the transformation algorithms will operate. For example, the address in the case of the address http://www.healthinsurance.com, the system will isolate the part of the address that comes after "http://www" and before the ".com" (also after the ".com" for sub sites.) The system will then convert the words into the Web surfer's native language using the system's simple English Hebrew dictionary. In this case health insurance. Then the system may reverse the order of the Hebrew words add the Hebrew variation of the "http://www" and the ".com", and display the address in the surfer's native language.

Figure 16:
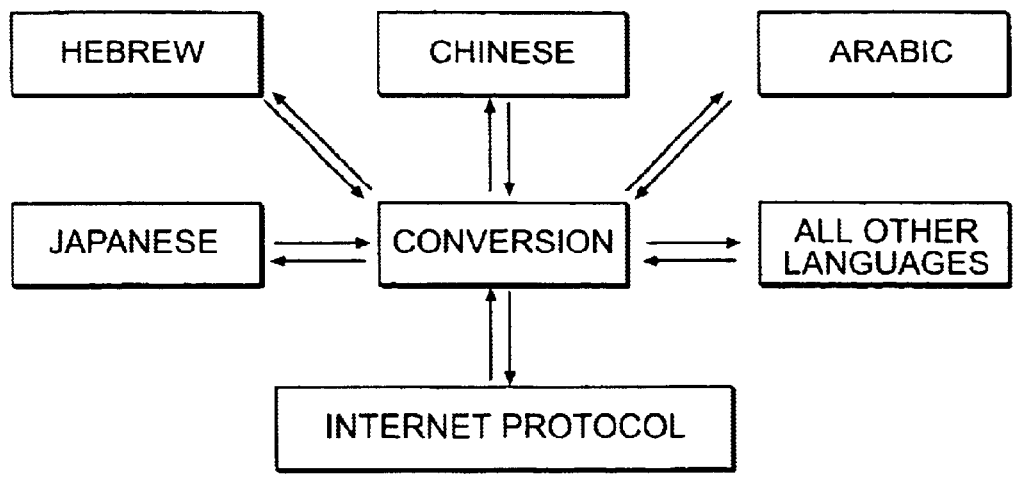
FIGS. 16 and 17 is a block diagram of the transformation involved in a preferred embodiment of the invention.
Figure 17:

The surfer will also be able to key in the address in his native language. The system will then reverse the process. When the system is unable to identify a word that is a part of the address, the address will appear in Hebrew but in a letter arbitrary form using the letter to letter conversion system. When it is a mix case, the system will use both the word to word as well as the letter to letter to construct the address. It will create an anomaly where a Latin letter may have more then one letter translations within the same address. That is because the value of the letters in the words translation system is fluid, while in the letter to letter system, the relationship is constant. In Japanese, where there are no letters, an embodiment of the invention may assign to every English character, a Japanese word that sounds like the letter or as close to sounding like it as possible so that surfers are able to recognize when a Japanese word is used to identify non-English letters. FIGS. 16 and 17 illustrate the conversion process.

2. Search Engine. All Internet protocol based search engines use English only. When a user of our system uses his/her native language to search the World Wide Web, they will insert the request in their own language. For example if a user inputs the words, the system's regular English Hebrew dictionary will convert those words to English namely "insurance life". The system may then reverse the order to life insurance and search for either one, or both arrangement. Also, the two-tier translation system will be put to use. Thus address and other Internet protocol marks that use letters that don't form words, will be search able and identifiable as well both as letter marks, or word marks, or a combination of the two. Once the system detects the requested locations, the surfer will have the option of viewing them in the users native language and or in the address's pre-conversion URL form. The system will also distinguish between addresses that are from the World Wide Web, or whether they are native language web site owners.

Preferred Embodiment of Invention in Browser

Structure of System

Figure 7:
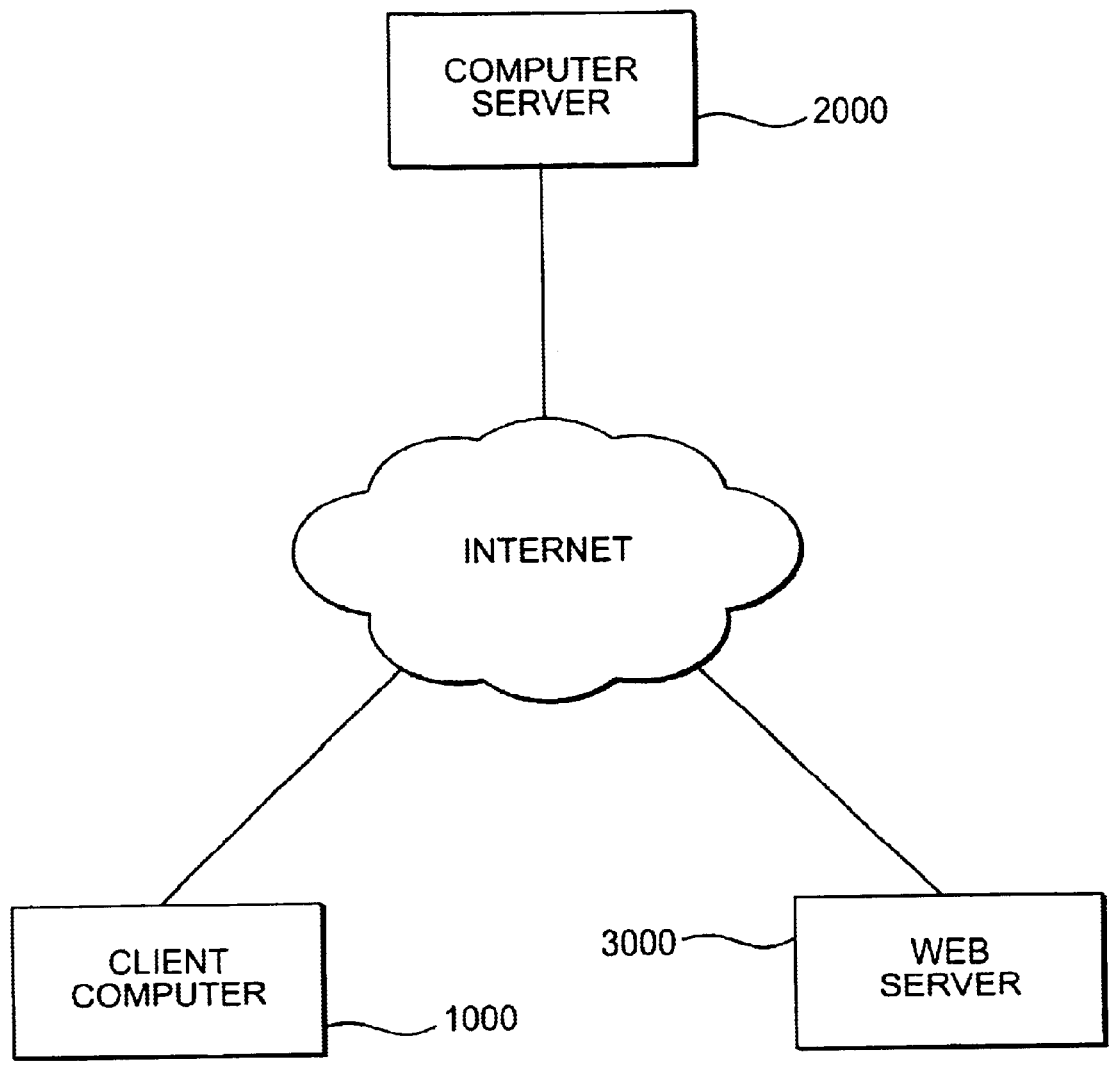
FIG. 7 is a block diagram showing a preferred embodiment of the system.

As illustrated in FIG. 7, the structure of a preferred embodiment is client computer 1000 which has access to the Internet. The computer server 2000 also has access to the Internet Web server 3000 also has access to the Internet.

Figure 8:
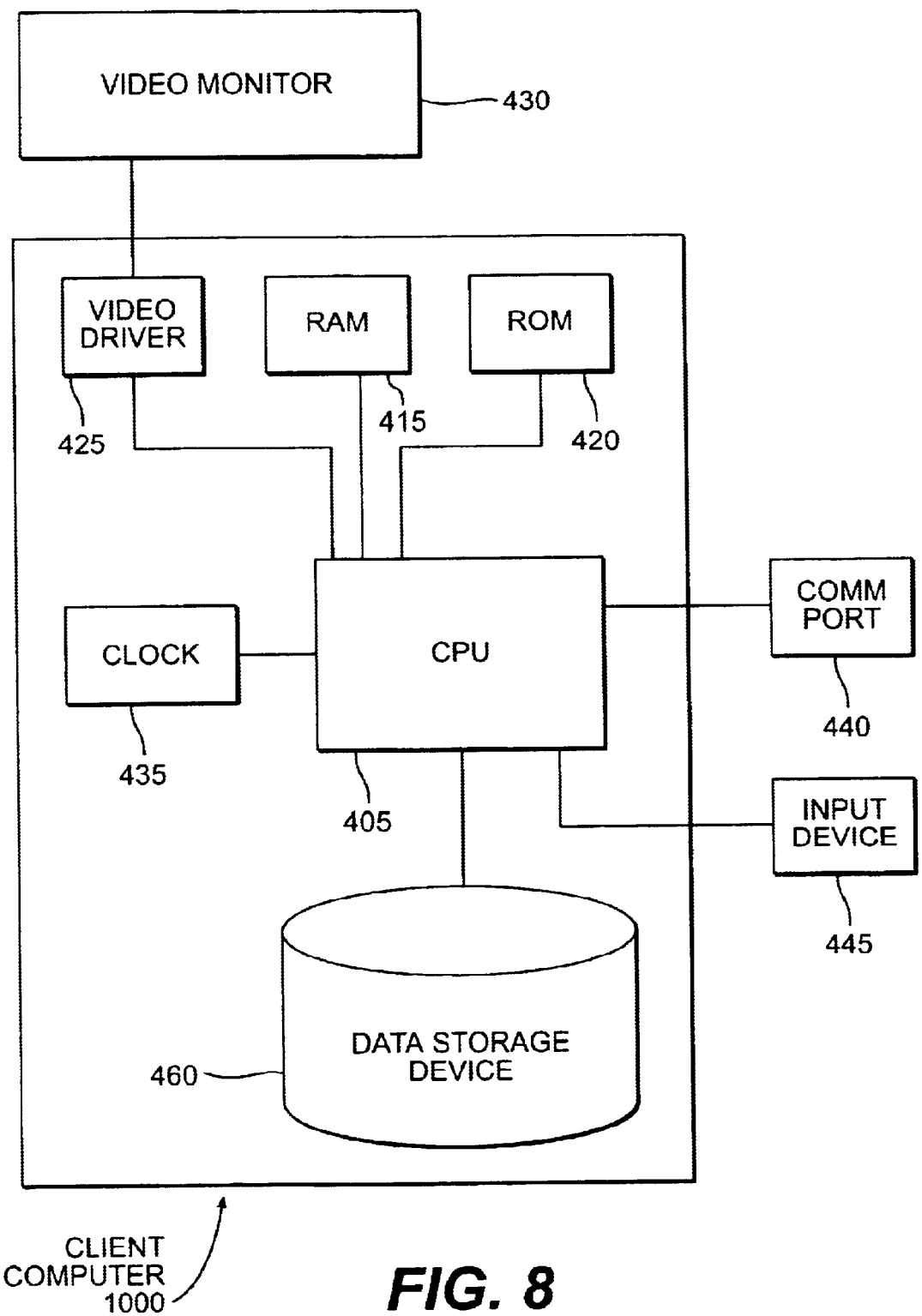
FIG. 8 is a block diagram showing one embodiment of the client computer.

Referring now to FIG. 8 client computer 1000 includes a CPU 405, Ram 415, ROM 420, clock 435, video driver 425, video monitor 430, communication port 440, input device 445 and data storage device 460.

Figure 9:
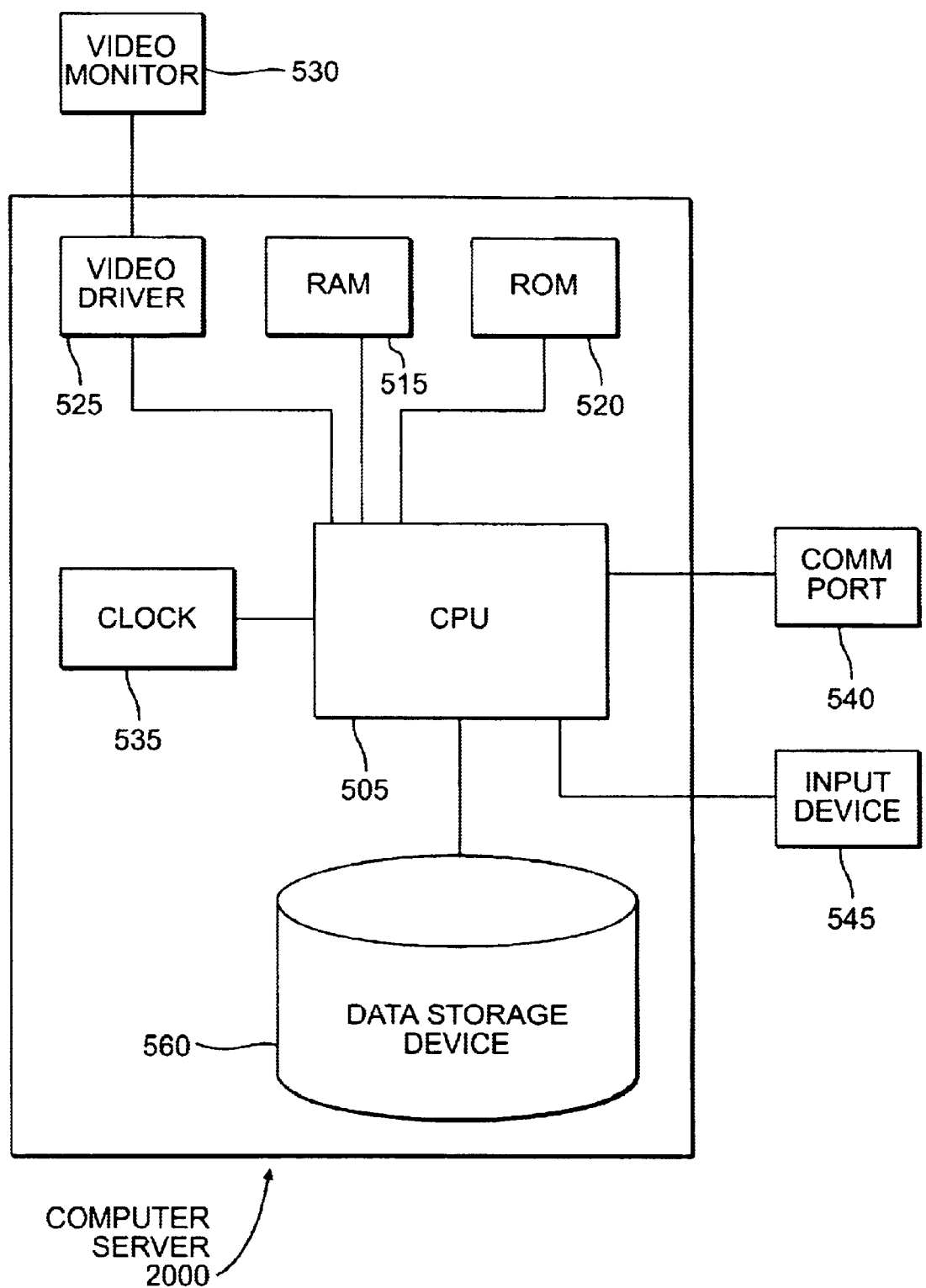
FIG. 9 is a block diagram showing one embodiment of the computer server.

Referring now to FIG. 9, computer server 2000 includes CPU 505, Ram 515, ROM 520, clock 535, video driver 525, video monitor 530, communication port 540, input device 545 and data storage device 560. Data storage device 560 contains data bases used in providing the conventional and friendly resource identifiers.

Figure 10:
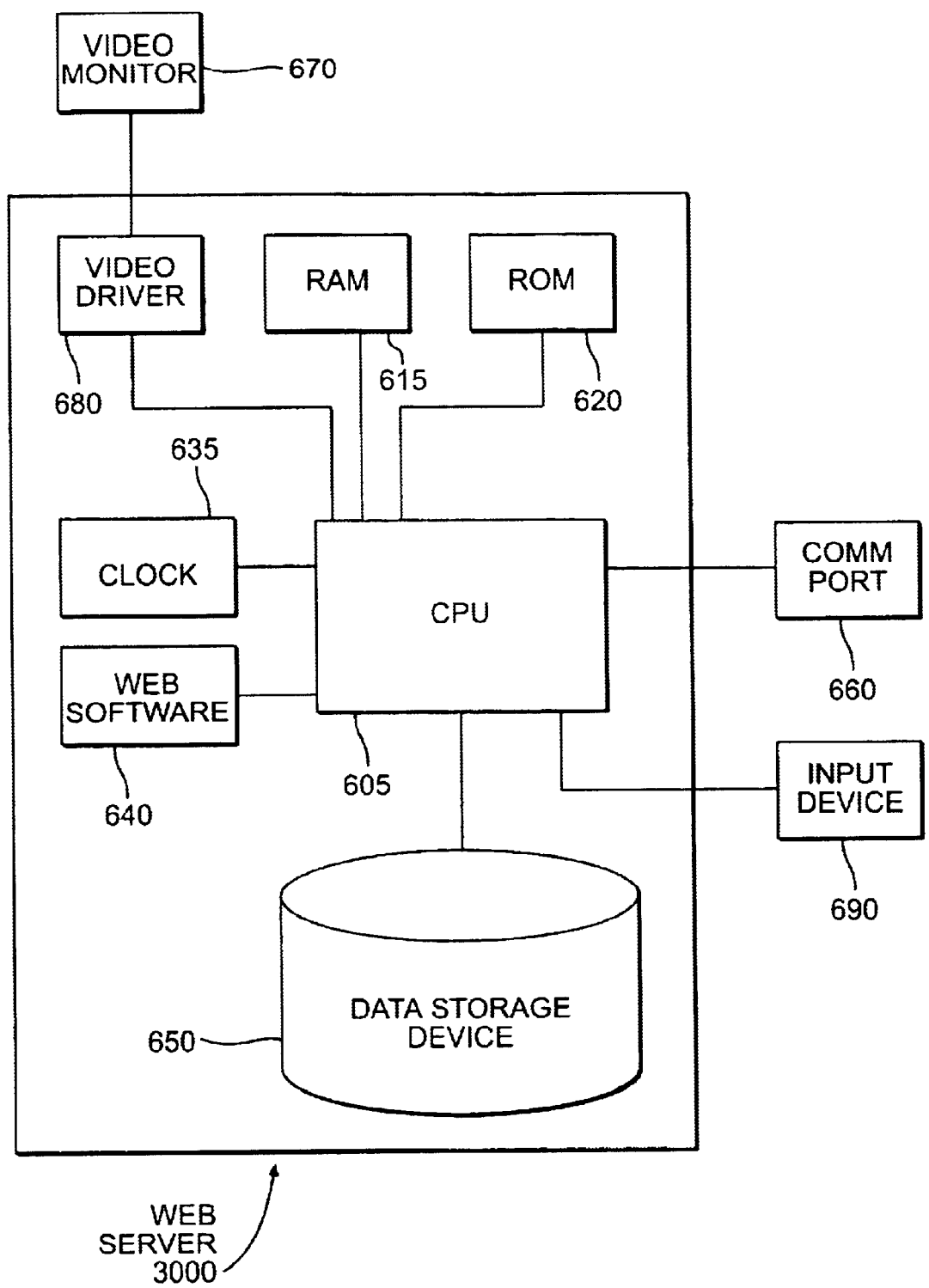
FIG. 10 is a block diagram showing one embodiment of the Web server.
Figure 11:
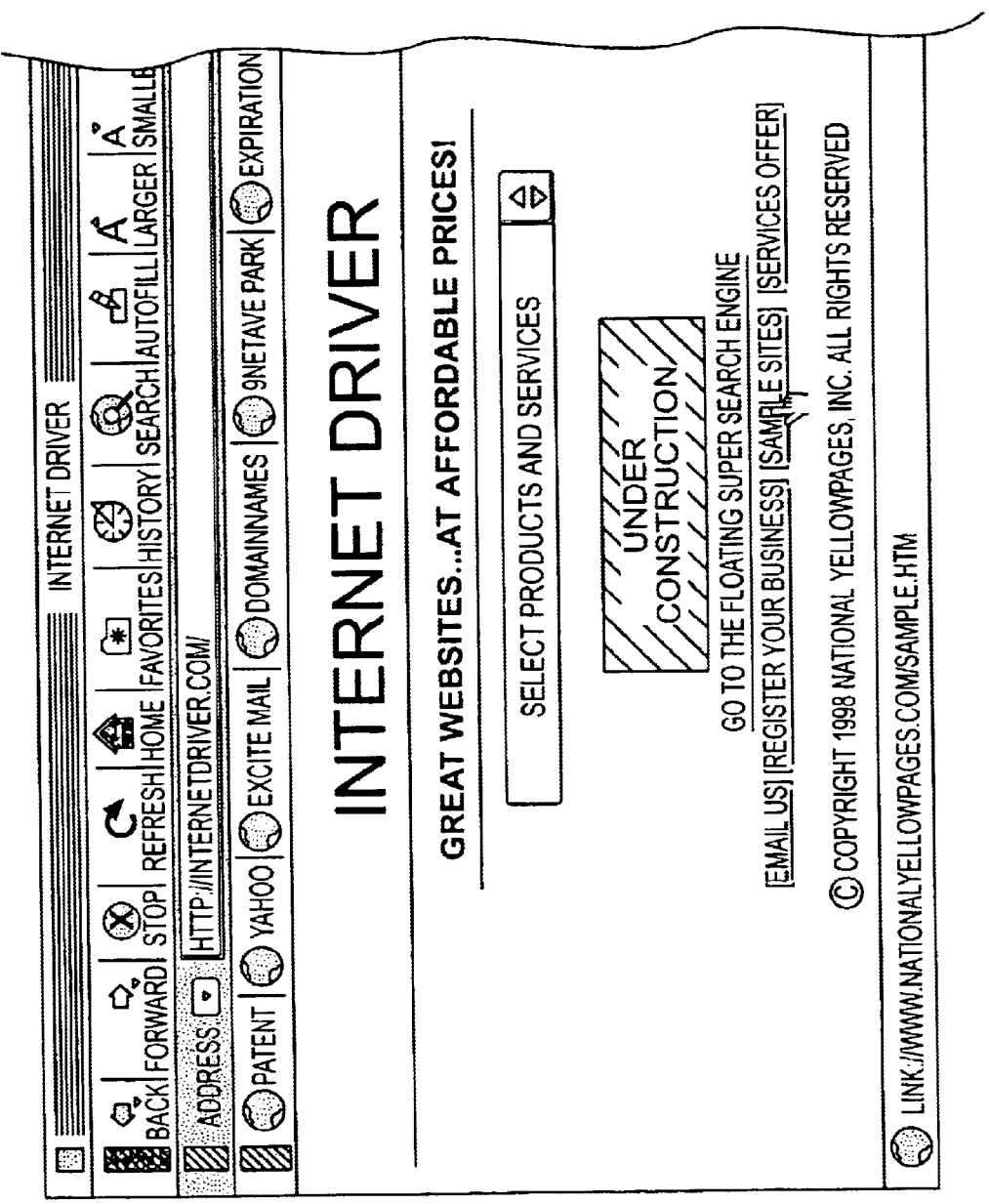
FIG. 11 is a screen shot of a conventional English language Web browser.
Figure 12:
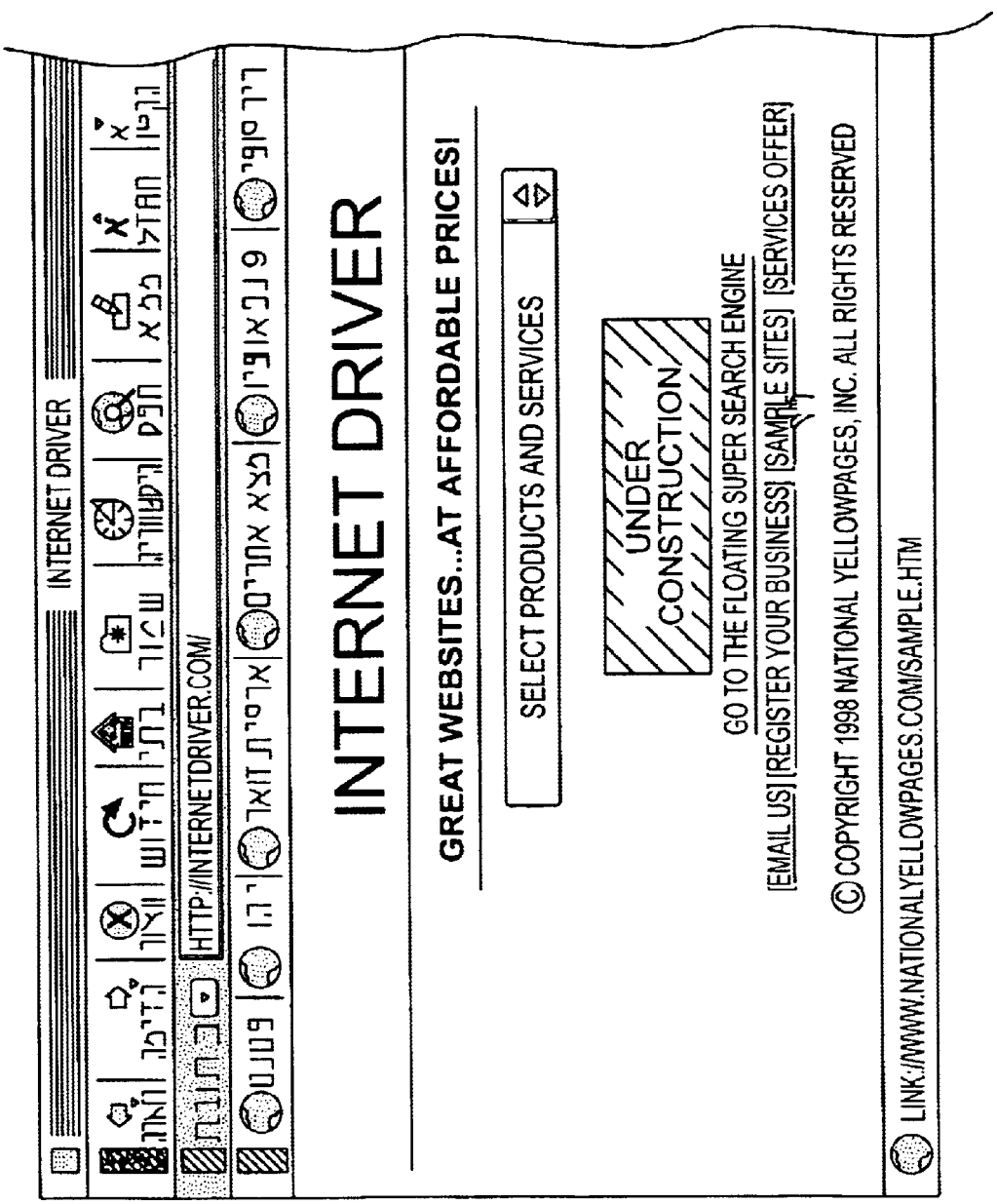
FIG. 12 is a screen shot of a conventional Hebrew language Web browser.

Similarly, as shown in FIG. 10 web server 3000 includes CPU 605, Ram 615, ROM 620, clock 635, Web software 640, and data storage device 650), Video Monitor 670, comments port 660 and Input Device 690.

Operation of System

One preferred embodiment of the invention would be a browser that incorporates software that uses the two algorithms. If the user types a Hebrew resource identifier, the computer must first convert the Hebrew resource identifier to a conventional resource identifier. The algorithm for this process would be the conversion algorithm or the mapping algorithm.

In one embodiment, the user of the browser would use computer server 2000 as an Internet Service Provider that would automatically download to the browser the mapping database. Alternatively, the mapping database in another embodiment would be e-mailed to the browser which would incorporate the new mappings into the existing database.

The operation of the system commences with the user of client computer 1000 inputting a friendly resource identifier using non-Latin characters. The client computer 1000 would formulate a file consisting of the information entered in non-Latin characters. The client computer 1000 would process the friendly resource locator using either the conversion algorithm or the mapping algorithm and would contact Web server 3000 for the appropriate HTML page FIG. 9 is a screen shot of such a browser.

In another preferred embodiment, client computer 1000 would contact computer server 2000. Computer server 2000 would then carry out the transformation algorithm and then transmit the information back to the client computer 1000, which would then use this information to obtain the HTML pages. In another preferred embodiment the server 2000 would obtain itself the HTML page and then retransmit the HTML page to the user. A variation of this preferred embodiment would use a browser that uses voice recognition technology.

It is important to note that both transformation algorithms could be applied. Normally, the mapping algorithms would be first applied. If the mapping algorithm was unsuccessful because no match was found, this the conversion algorithm (which will always be successful) will be executed. It is contemplated that Web site owners will arrange to have their conventional resource identifiers stored in the database of the mapping algorithm and given friendly resource identifiers.

It should also be noted that the mapping algorithm may be successful for part of the resource identifiers (such as the conventional server name) but not for the HTML document. In that case, the mapping algorithm would be applied to the conventional server name and the conversion algorithm would be applied to the remaining portion of the resource identifiers.

Preferred Embodiment of Invention in Hosting System

Figure 13:
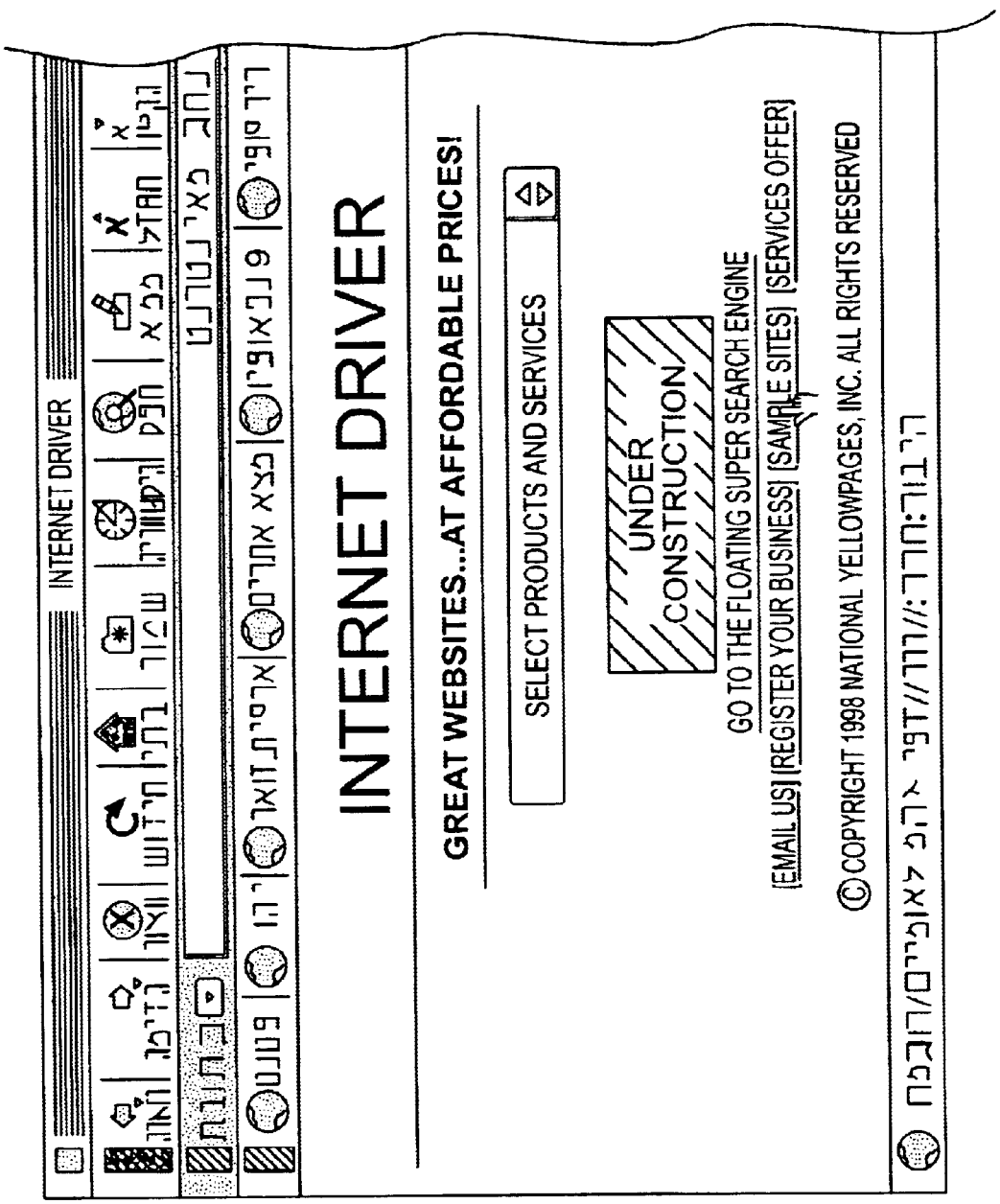
FIG. 13 is a screen shot of a Hebrew language Web browser that is a preferred embodiment of the invention.
Figure 14:
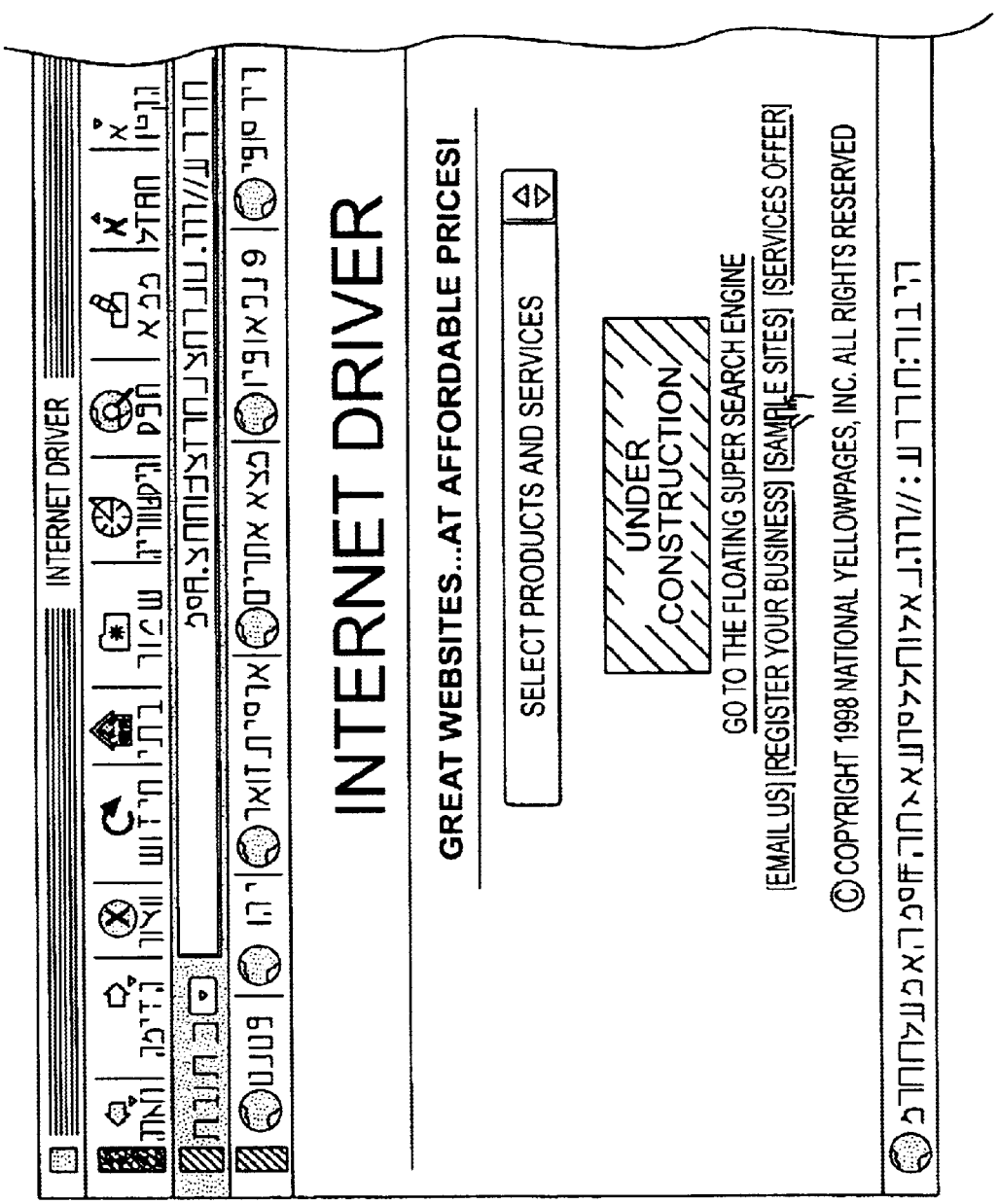
FIG. 14 is a screen shot of a Hebrew language Web browser that is another preferred embodiment of the invention.
Figure 15:
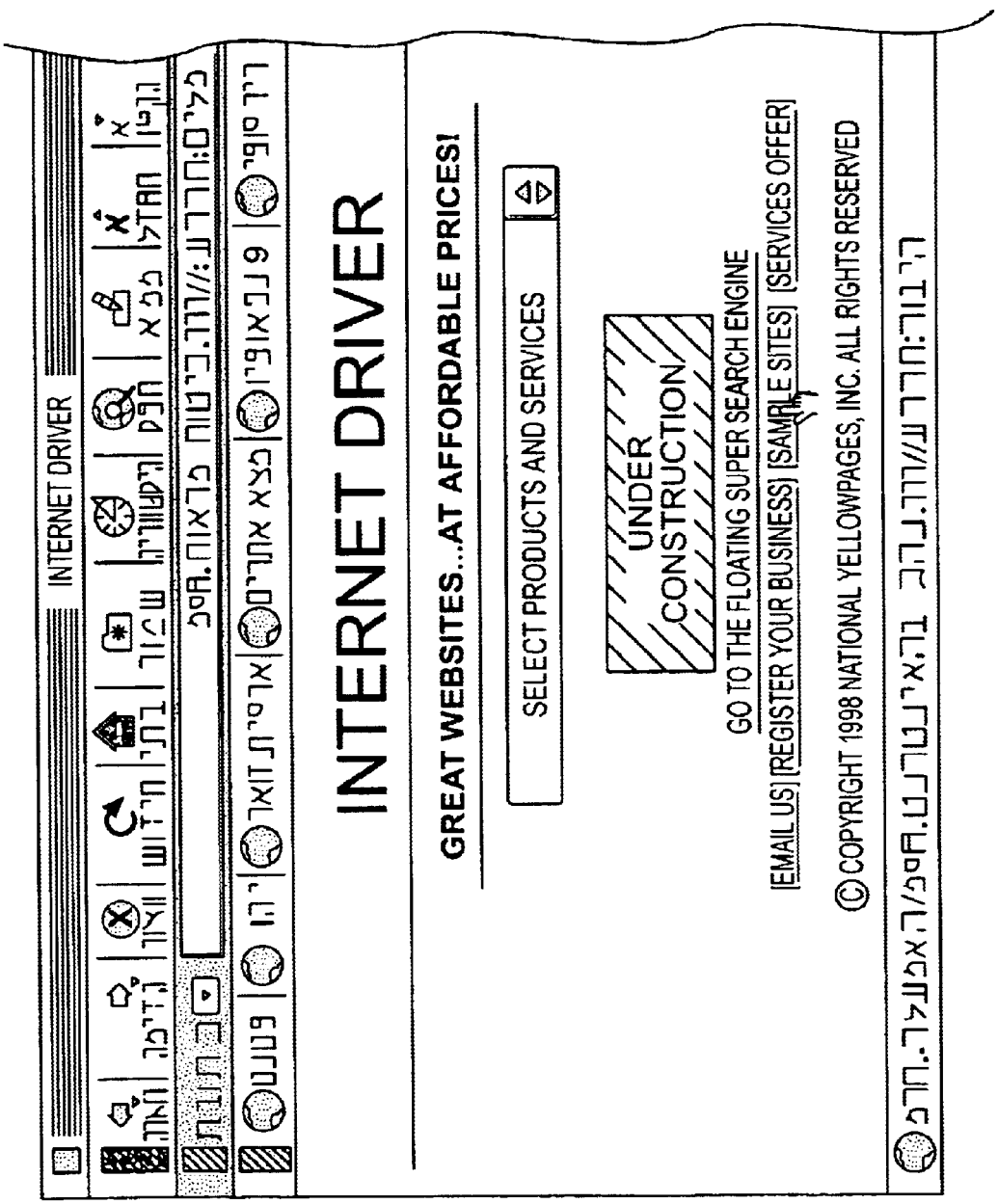
FIG. 15 is a screen shot of a Hebrew language Web browser that is another preferred embodiment of the invention.

In a preferred embodiment of the hosting system, the computer server 2000 would host HTML page on its system. The user would input the friendly resource identifier for one of these hosted HTML pages. In one preferred embodiment the client computer 1000 would transform the friendly resource identifier into the appropriate conventional resource identifier. The client computer 1000 would then retrieve the appropriate HTML page from computer server 2000. In another preferred embodiment the client computer 1000 would automatically contact the computer server 2000 in the event that a non-conventional resource identifier is inputted. The computer server 2000 would then perform the conversions In either case, if the Hebrew is inputted the appropriate HTML page would retrieve and would appear as a top level Web site as shown in FIGS. 13, 14 and 15.

This HTML page would also be available to a client computer 1000 that does not use a preferred embodiment but the resource identifier would be conventional one such as "http://www.worldwideurls.com/bjifh-hjjm.

Preferred Embodiment of Invention in Portal System

A portal is the common term for a directory of Internet resources. The invention could also be embodied in a portal system in all resource identifiers are friendly resource identifiers. The portal server would use the conversion algorithm or the mapping algorithm to supply the information to client computer 1000 to retrieve the appropriate HTML document.

Preferred Embodiment of Invention in Search Engine

In yet another embodiment of the invention, the friendly search term would be converted into various conventional using the transformation algorithms Latin search words and a conventional search would be executed. The results would be returned to the browser using either the conversion algorithm or the mapping algorithm.

E-Mail

In another embodiment of the invention, the e-mail address would be mapped from Latin to non-Latin characters or the reverse. Either the conversion algorithm or the mapping algorithm would be used. Accordingly, a user whose written language does not consist of Latin characters would be able to use e-mail using the characters of the written language.

Figure 18:
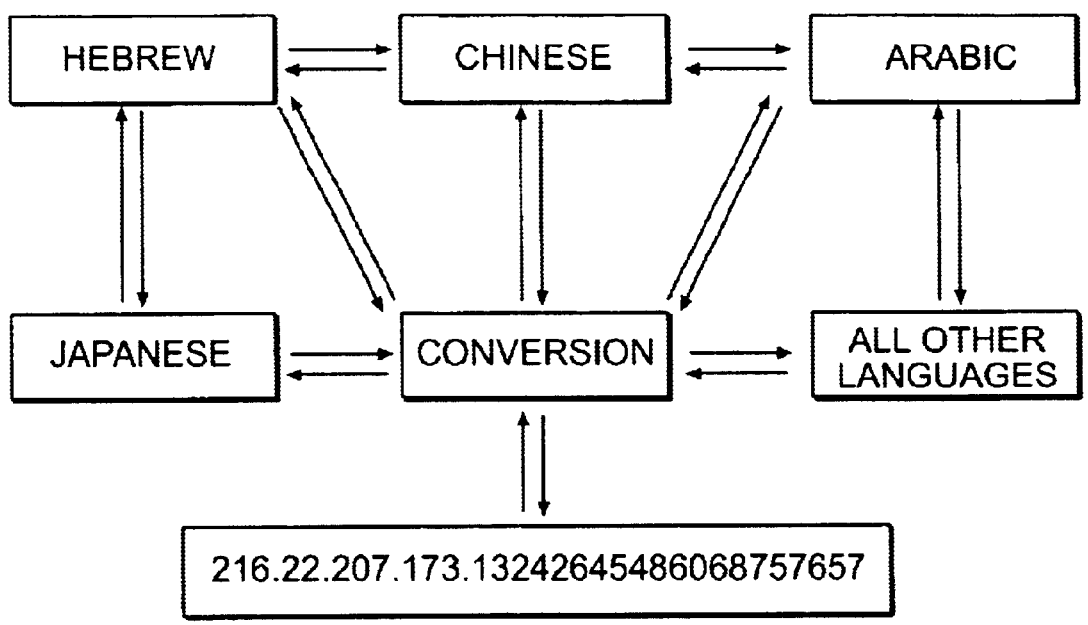
FIGS. 18 and 19 is a block diagram of the transformation involved in another preferred embodiment of the invention.
Figure 19:
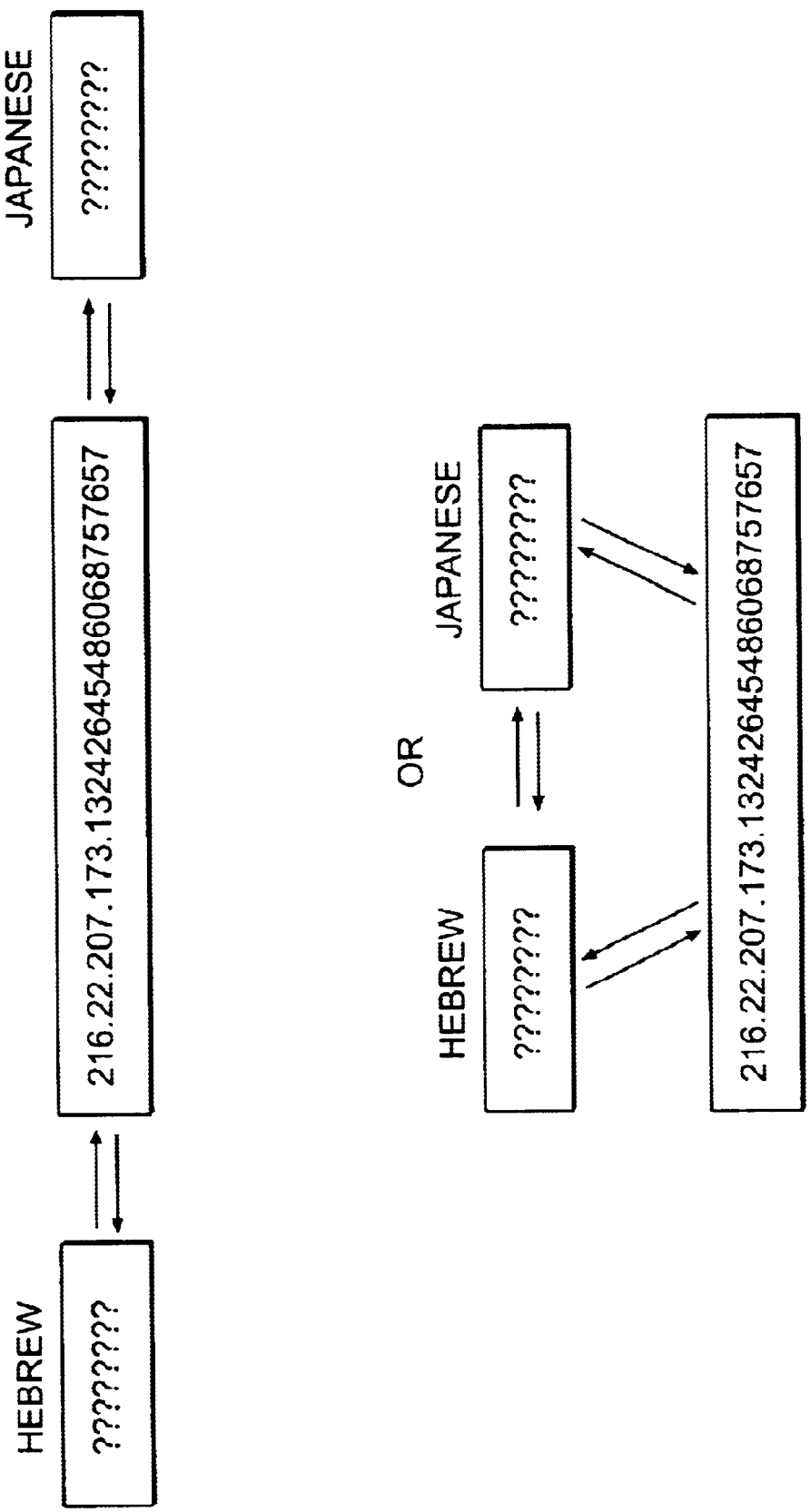

The various preferred embodiments of the invention have relied upon transforming a friendly resource identifier to a conventional resource identifier, however, referring now to FIGS. 18 and 19 invention could also be adapted so that the friendly resource identifier is transformed into the 32 bit IP address without using the service of a Domain Name Server.

While the present invention has been described with respect to the particular embodiments, it will be apparent to those skilled in the art that various changes and modifications may be made without departing from the spirit and scope of the invention as defined in the following claims.

What is claimed is:

1. A method for using a non-Latin universal resource locator (URL) in place of a conventional resource identifier in accessing resources on the Internet, comprising the following steps:
   furnishing the alternative resource identifier to an apparatus that can access the Internet;
   transforming the non-Latin URL to a conventional resource identifier;
   accessing a resource on the Internet using the conventional resource identifier; and
   displaying the resource to the user;
   wherein said a non-Latin URL consists of words, letters, or characters, or a combination thereof, in a first language, and said conventional resource identifier consists of words, letters, or characters, or a combination thereof, in a second language;
   wherein said first language is different than said second language; and
   wherein said transforming step transforms the non-Latin URL to the conventional resource identifier in a manner such that words in the first language are related semantically to words in the second language, with the words in the fist language and the words in the second language having the same meaning.

2. A computer system providing user requests containing a universal resource locator (URL) across a network, said computer system comprising:
   a browser means running on said computer system, for enabling said user to enter a non-Latin URL address;
   a conversion means connected to said browser means, for receiving said non-Latin URL address from said browser means and converting said non-Latin URL address to an conventional URL address; and
   a transmission means connected to said conversion means, for receiving said conventional URL address and transmitting said conventional URL address across the network;
   wherein said non-Latin URL address consists of words, letters, or characters, or a combination thereof, in a first language, and said conventional URL address consists of words, letters or characters, or a combination thereof, in a second language;
   wherein said first language is different than said second language; and
   wherein said conversion means converts the non-Latin URL address to the conventional URL address in a manner such that words in the first language are related semantically to words in the second language, such that the words in the first language and the words in the second language have the same meaning.

3. The computer system as recited in claim 2, wherein said conversion means includes:
   a translation means for translating said non-Latin URL address to an alphanumeric text string; and
   a mapping means for relating a predetermined text string to said alphanumeric text string, thereby generating said conventional URL address.

4. The computer system as recited in claim 3, wherein said predetermined text string designates the homepage address of a unique management server in the network.

5. The computer system as recited in claim 3, wherein all user requests containing said non-Latin URL address are destined to the homepage of said unique management server.

6. The computer system as recited in claim 3, wherein said predetermined text string designates a subsite of a homepage address of a unique management server in a network.

7. A method of converting a non-Latin URL address to a conventional URL address in a computer system, wherein the computer system provides user requests containing a universal resource locator across a network said method comprising the steps of:
   receiving a non-Latin URL address;
   converting said non-Latin URL address to a conventional URL address; and
   transmitting said conventional URL address across the network;
   wherein said non-Latin URL address consists of words, letters, or characters, or a combination thereof, in a first language, and said conventional URL address consists of words, letters, or characters, or a combination thereof, in a second language;
   wherein said converting language is different than said second language; and
   wherein said converting step converts the non-Latin URL address to the conventional URL address in a manner such that words in the first language are related semantically to words in the second language, such that the words in the first language and the words in the second language have the same meaning.

8. The method as recited in claim 7, wherein said converting step includes the steps of:
   translating said non-Latin URL address to an alphanumeric text string; and
   mapping a predetermined text string to said alphanumeric text string, thereby generating said conventional URL address.

9. The method as recited in claim 8, wherein said predetermined text string designates the homepage address of a unique management server in the network.

10. The method as recited in claim 8, wherein all user requests containing said non-Latin URL address are destined to the homepage of said unique management server.

11. The method as recited in claim 8, wherein said predetermined text string designates a subsite of a homepage address of a unique management server in a network.

12. A method for using a non-Latin universal resource locator (URL) in place of a conventional resource identifier in accessing resources on the Internet, comprising the following steps:
   furnishing the non-Latin URL to an apparatus that can access the Internet;
   transforming the non-Latin URL to a conventional resource identifier;
   accessing a resource on the Internet using the conventional resource identifier; and
   displaying the resource to the user;
   wherein said a non-Latin URL consists of words, letters, or characters, or a combination thereof in a first language, and said conventional resource identifier consists of words, letters, or characters, or a combination thereof, in a second language;
   wherein said first language is different than said second language; and
   wherein said transforming step transforms the non-Latin URL to the conventional resource identifier in a manner such that letters or characters in the first language are related phonetically to letters or characters in the second language, such that the letters or characters in the first language and the letters or characters in the second language are similar based on the sound of letters or characters in said first language and second language.

13. A method for using a non-Latin universal resource locator (URL) in place of a conventional resource identifier in accessing resources on the Internet, comprising the following steps:

furnishing the non-Latin URL to an apparatus that can access the Internet;

transforming the non-Latin URL to a conventional resource identifier;

accessing a resource on the Internet using the conventional resource identifier; and displaying the resource to the user;

wherein said non-Latin URL consists of words, letters, or characters, or a combination thereof, in a first language, and said conventional resource identifier consists of words, letters, or characters, or a combination thereof, in a second language;

wherein said first language is different than said second language; and wherein said transforming step transforms the non-Latin URL to the conventional resource identifier by parsing identifiable words in the non-Latin URL from letters or characters, in a manner such that words, letters, or characters, or a combination thereof, in the first language are related to words, letters, or characters, or a combination thereof, in the second language in a semantic and phonetic manner, such that the words in the first language and the words in the second language have the same meaning, and such that the letters or characters in the first language and the letters or characters in the second language are similar based on the sound of letters or characters in said first language and second language.

14. A computer system providing user requests containing a universal resource locator (URL) across a network, said computer system comprising:

a browser means running on said computer system, for enabling said user to enter a non-Latin URL address;

a conversion means connected to said browser means, for receiving said non-Latin URL address from said browser means and converting said non-Latin URL address to an conventional URL address; and a transmission means connected to said conversion means, for receiving said conventional URL address and transmitting said conventional URL address across the network;

wherein said non-Latin URL address consists of words, letters, or characters, or a combination thereof, in a first language, and said conventional URL address consists of words, letters, or characters, or a combination thereof, in a second language;

wherein said first language is different than said second language; and wherein said conversion means converts the non-Latin URL address to the conventional URL address in a manner such that letters or characters in the first language are related phonetically to letters or characters in the second language, such that the letters or characters in the first language and the letters or characters in the second language are similar based on the sound of letters or characters in said first language and second language.

15. The computer system as recited in claim 14, wherein said conversion means includes:

a translation means for translating said non-Latin URL address to an alphanumeric text string; and a mapping means for relating a predetermined text string to said alphanumeric text string, thereby generating said conventional URL address.

16. The computer system as recited in claim 15, wherein said predetermined text string designates the homepage address of a unique management server in the network.

17. The computer system as recited in claim 15, wherein all user requests containing said non-Latin URL address are destined to the homepage of said unique management server.

18. The computer system as recited in claim 15, wherein said predetermined text string designates a subsite of a homepage address of a unique management server in a network.

19. A computer system providing user requests containing a universal resource locator (URL) across a network, said computer system comprising:

a browser means running on said computer system, for enabling said user to enter a non-Latin URL Address;

a conversion means connected to said browser means, for receiving said non-Latin URL address from said browser means and converting said non-Latin URL address to an conventional URL address, and a transmission means connected to said conversion means, for receiving said conventional URL address and transmitting said conventional URL address across the network;

wherein said non-Latin URL address consists of words, letters, or characters, or a combination thereof, in a first language, and said conventional URL address consists of words, letters, or characters, or a combination thereof, in a second language;

wherein said first language is different than said second language; and wherein said conversion means converts the non-Latin URL address to the conventional URL address by parsing identifiable words in the non-Latin URL from letters or characters, in a manner such that words, letters, or characters, or a combination thereof, in the first language are related to words, letters, or characters, or a combination thereof, in the second language in a semantic and phonetic manner, such that the words in the first language and the words in the second language have the same meaning, and such that the letters or characters in the first language and the letters or characters in tire second language are similar based on the sound of letters or characters in said first language and second language.

20. The computer system as recited in claim 19, wherein said conversion means includes:

a translation means for translating said non-Latin URL address to an alphanumeric text string; and a mapping means for relating a predetermined text string to said alphanumeric text string, thereby generating said conventional URL address.

21. The computer system as recited in claim 20, wherein said predetermined text string designates the homepage address of a unique management server in the network.

22. The computer system as recited in claim 20, wherein all user requests containing said non-Latin URL address are destined to the homepage of said unique management server.

23. The computer system as recited in claim 20, wherein said predetermined text string designates a subsite of a homepage address of a unique management server in a network.

24. A method of converting a non-Latin URL address to a conventional URL address in a computer system, wherein the computer system provides user requests containing a universal resource locator (URL) across a network, said method comprising the steps of:

receiving a non-Latin URL address;

converting said non-Latin URL address to a conventional address; and transmitting said conventional URL address across the network;

wherein said non-Latin URL address consists of words, letters, or characters, or a combination thereof, in a first language, and said conventional URL address consists of words, letters, or characters, or a combination thereof, in a second language;

wherein said first language is different than said second language; and wherein said converting step converts the non-Latin URL address to the conventional URL address in a manner such that letters or characters in the first language are related phonetically to letters or characters in the second language, such that the letters or characters in the first language and the letters or characters in the second language are similar based on the sound of letters or characters in said first language and second language.

25. The method as recited in claim 24, wherein said converting step includes the steps of:

translating said non-Latin URL address to an alphanumeric text string; and mapping a predetermined text string to said alphanumeric text string, thereby generating said conventional URL address.

26. The method as recited in claim 25, wherein said predetermined text string designates the homepage address of a unique management server in the network.

27. The method as recited in claim 25, wherein all user requests containing said non-Latin URL address are destined to the homepage of said unique management server.

28. The method as recited in claim 25, wherein said predetermined address designates a subsite of a homepage address of a unique management server in a network.

29. A method of converting a non-Latin URL address to a conventional URL address in a computer system, wherein the computer system provides user requests containing a universal resource locator (URL) across a network, said method comprising the steps of:

receiving a non-Latin URL address;

converting said non-Latin URL address to a conventional URL address; and transmitting said conventional URL address across the network;

wherein said non-Latin URN address consists of words, letters, or characters, or a combination thereof, in a first language, and said conventional URL address consists of words, letters, or characters, or a combination thereof, in a second language;

wherein said first language is different than said second language; and wherein said converting step converts the non-Latin URL address to the conventional URL address by parsing identifiable words in the non-Latin URL from letters or characters, in a manner such that words, letters, or characters, or a combination thereof, in the first language are related to words, letters, or characters, or a combination thereof, in the second language in a semantic and phonetic manner, such that the words in the first language and the words in the second language have the same meaning, and such that the letters or characters in the first language and the letters or characters in the second language are similar based on the sound of letters or characters in said first language and second language.

30. The method as recited in claim 29, wherein said converting step includes the steps of:

translating said non-Latin URL address to an alphanumeric text string; and mapping a predetermined text string to said alphanumeric text string, thereby generating said conventional URL address.

31. The method as recited in claim 30, wherein said predetermined text string designates the homepage address of a unique management server in the network.

32. The method as recited in claim 30, wherein all user requests containing said non-Latin URL address are destined to the homepage of said unique management server.

33. The method as recited in claim 30, wherein said predetermined address designates a subsite of a homepage address of a unique management server in a network.

34. A method for using a non-Latin URL in place of a conventional resource identifier in accessing resources on the Internet, comprising the following steps:

furnishing a non-Latin URL to an apparatus that can access the Internet, transforming the non-Latin URL to a conventional resource identifier;

accessing a resource on the Internet using the conventional resource identifier; and displaying the resource to the user;

wherein said non-Latin URL and said conventional resource identifier exist as separate languages wherein said separate languages are different languages and wherein said non-Latin URL and said conventional resource identifier designate Internet subsite addresses.

35. A computer system providing user requests containing a universal resource locator across a network, said computer system comprising:

a browser means running on said computer system, for enabling said user to enter a non-Latin URL address;

a conversion means connected to said browser means, for receiving said non-Latin URL address from said browser means and converting said non-Latin URL address to a conventional URL address; and a transmission means connected to said browser means, for receiving said conventional URL address and transmitting said conventional URL address across the network;

wherein said non-Latin URL and said conventional resource identifier exist as separate languages wherein said separate languages are different languages and wherein said non-Latin URL and said conventional resource identifier designate 36. A method of converting a non-Latin URL address to a conventional URL address in a computer system, wherein the computer system provides user requests containing a universal resource locator across a network, said method comprising the steps of:

receiving a non-Latin URL address;

converting said non-Latin URL address to a conventional URL address; and transmitting said conventional URL address across the network;

wherein said non-Latin URL address and said conventional URL address exist as separate languages wherein said separate languages are different languages and wherein said non-Latin URL and said conventional resource identifier designate Internet subsite addresses.

37. A method for transforming a conventional resource identifier to a non-Latin resource identifier, comprising the following steps:

providing the conventional resource identifier;

transforming the conventional resource identifier to a non-Latin URL by parsing identifiable words in the non-Latin URL from letters or characters;

wherein said conventional resource identifier consists of words, letters, or characters, or a combination thereof, in a first language, and said non-Latin URL consists of words, letters, or characters, or a combination thereof, in a second language, such that the words in the first language and the words in the second language have the same meaning, and such that the letters or characters in the first language and the letters or characters in the second language are similar based on the sound of letters or characters in said first language and second language; and wherein said first language is different than said second language.

38. A computer system providing user requests containing a universal resource locator (URL) across a network, said computer system comprising:

a provision means running on said computer system, for enabling said user to enter a conventional URL address;

a conversion means connected to said provision means, for receiving said conventional URL address from said provision means and converting said conventional URL address to a non-Latin URL address by parsing identifiable words in the non-Latin URL address from letters or characters;

wherein said conventional URL address consists of words, letters, or characters, or a combination thereof, in a first language, and said non-Latin URL address consists of words, letters, or characters, or a combination thereof, in a second language, such that the words in the first language and the words in the second language have the same meaning, and such that the letters or characters in the first language and the letters or characters in the second language are similar based on the sound of letters or characters in said first language and second language; and wherein said first language is different than said second language.

39. A method of converting a conventional URL address to an alternative URL address in a computer system, said method comprising the steps of:

receiving a conventional URL address;

converting said conventional URL address to a non-Latin URL address by parsing identifiable words in the alternative resource identifier from letters or characters;

wherein said conventional URL address consists of words, letters, or characters, or a combination thereof, in a first language, and said non-Latin URL address consists of words, letters, or characters, or a combination thereof, in a second language, such that the words in the first language and the words in the second language have the same meaning, and such that the letters or characters in the first language and the letters or characters in the second language are similar based on the sound of letters or characters in said first language and second language; and wherein said first language is different than said second language.

* * * * *